United States Patent [19]

Tassi et al.

[11] 4,019,623
[45] Apr. 26, 1977

[54] CONVEYANCE UNIT WITH CROSSING, ESPECIALLY FOR THE CONVEYANCE AND SWITCHING OF NEWSPAPERS, MAGAZINES AND OTHER ARTICLES COMPOSED BY SUPERPOSED SHEETS

[75] Inventors: Lamberto Tassi; Aris Ballestrazzi; Gianni Tosarelli, all of Vignola, Italy

[73] Assignee: Situno Holding S.A., Luxembourg, Luxembourg

[22] Filed: Apr. 5, 1976

[21] Appl. No.: 673,548

[30] Foreign Application Priority Data

Apr. 3, 1975 Italy ................................ 21969/75

[52] U.S. Cl. .................. 198/457; 198/471; 271/275
[51] Int. Cl.$^2$ ......................................... B65G 47/00
[58] Field of Search .......... 198/457, 362, 471, 456, 198/20 R, 27, 78; 271/198, 275

[56] References Cited

UNITED STATES PATENTS

| 1,857,605 | 5/1932 | Rapley | 198/457 |
| 3,029,923 | 4/1962 | Bilocq et al. | 198/456 |
| 3,116,822 | 1/1964 | Carus | 198/471 X |

FOREIGN PATENTS OR APPLICATIONS

| 232,451 | 3/1960 | Australia | 198/20 |

Primary Examiner—Evon C. Blunk
Assistant Examiner—Douglas D. Watts
Attorney, Agent, or Firm—Cushman, Darby & Cushman

[57] ABSTRACT

In a conveyance system with crossing paths, such as used in the conveyance of piled-up articles such as newpapers and the like, the improvement consisting in providing two couples of belts arranged crosswise relative to one another and equipped with a lifting mechanism capable of lifting and depressing one couple of belts relative to the other. The lifting mechanism comprises an array of idle belt-tightening rollers and fixed rollers, a few rollers being mounted in such a way as to impart a U-bend to top belt lap, the U-bend area being mounted on a special swingable arm. Appropriate linkages ensure the desired synchronization of the movement of the upper laps of the belts, so that the articles on the belts can easily be passed from a lower-level belt to a higher-level belt, and viceversa. It is also possible to select which belts are to stand at a higher or lower level as necessity demands. Such a mechanism enables the piles of sheets to be switched from a conveying path to another without disturbing the correct superposition of the articles in the heaps.

2 Claims, 4 Drawing Figures

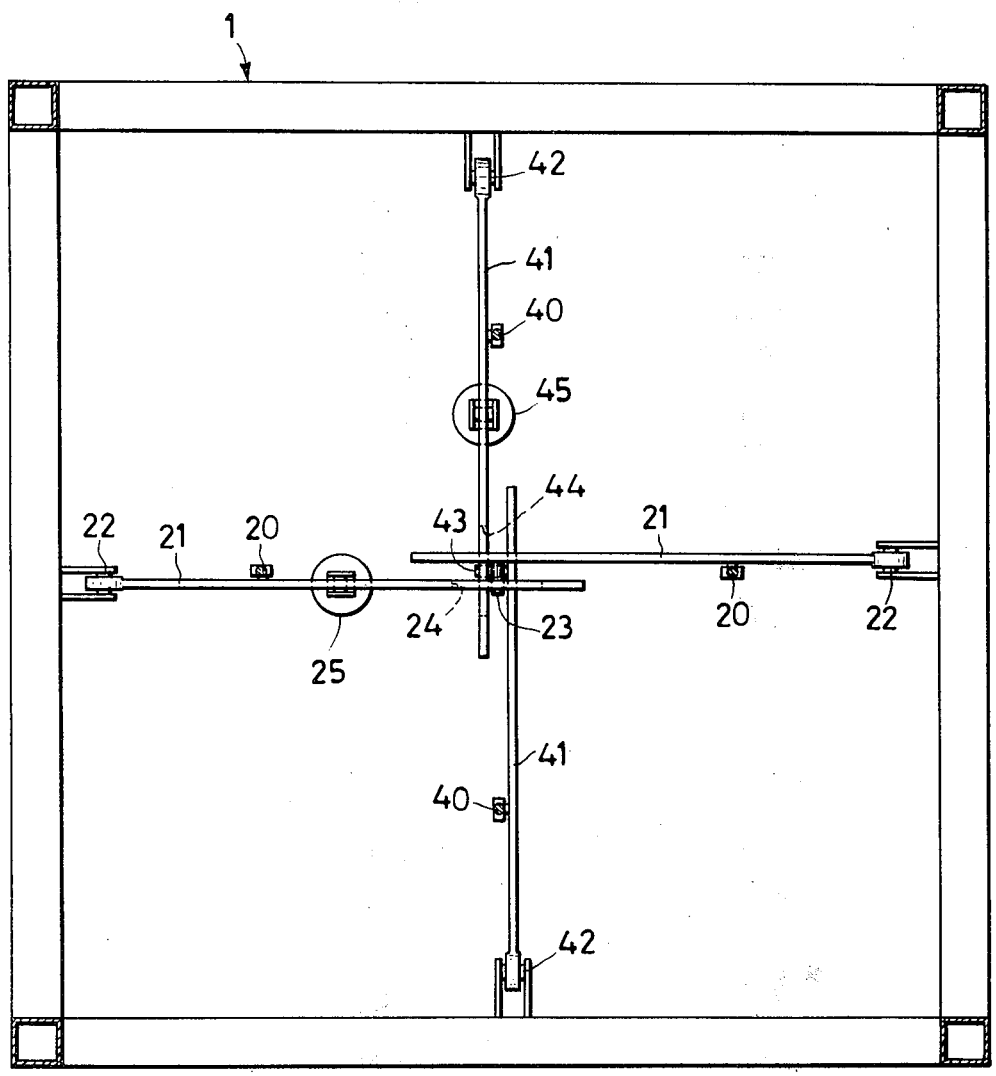

CONVEYANCE UNIT WITH CROSSING, ESPECIALLY FOR THE CONVEYANCE AND SWITCHING OF NEWSPAPERS, MAGAZINES AND OTHER ARTICLES COMPOSED BY SUPERPOSED SHEETS

This invention relates to a conveyance unit with crossing, which is particularly suitable for the conveyance and switching of newspapers, magazines and other articles composed by superposed sheets.

For the conveyance and switching of newspapers and like articles as collected in piled-up bundles, conveyance units with crossing are used, which are composed by a roller conveyor and a twin-chain conveyor, the crossing of which is effected by having the two chains of the latter conveyor passing between one roller of the roller conveyor and another. Appropriate means are provided for shifting in the vertical direction these conveyors relative to one another, so as to enable the articles, which are forwarded by the conveyor and each time at a level higher than immediately before, either to go along their run on the same conveyor, or to be switched to the other conveyor, according to whether the relative positions of the two conveyors has been left unaltered or varied at the very moment at which the articles reach the crossing area.

The use of this conventional type of conveying system with crossing has the defect that, when the articles are borne by the roller conveyor, more particularly immediately after that they have been shifted thereon coming from the chain conveyor, the edges of the sheets which compose the article show a tendency towards being pinched between one roller and another, thus causing a relative slip of the superposed sheets, a fact which causes them to lose that exact superposition relationship which is ideally desirable not only from an aesthetic point of view, but also, above all, from that of the satisfactory keeping of the articles, especially the newspapers.

An object of the present invention is thus to provide a conveyance system with crossing which is exempt from the defect as mentioned above and which, more particularly, permits both the conveyance and the switching of newspapers or other articles composed by superposed sheets without causing these articles to lose the desirable condition of exact superposition in the pile.

According to the invention, this object is achieved by means of a conveyance system with crossing, comprising two conveyors which cross perpendicularly to one another and are displaceable in the vertical direction with respect to one another so that either of them is alternately positioned at a higher level than the other one, characterized in that each of these conveyors is composed by a couple of parallel and coplanar belts, which cross those of the other couple while undergoing temporary U-shaped deflections with respect to their normal run direction so as to be passed the ones beneath the others, the crossing being so obtained that a first belt of a first couple is passed beneath a first belt of the second couple, the second belt of the first couple is passed beneath the second belt of the second couple, the first belt of the second couple is passed beneath the second belt of the first couple and the second belt of the second couple is passed beneath the first belt of the first couple, so that each edge of the articles conveyed by the couple of bands, each time at a position at a higher level than before, is constantly and reliably laid on one of the bands of said couple which is at a higher level.

It is apparent that the conveying system according to the invention has the advantage of providing the use of conveyor belts which, as is well known, are an ideal supporting surface for the articles to be conveyed and which, this being not equally well known, are properly crossed so as to permit switching the articles from one belt to another without any prejudice of their conveyance conditions.

A practical exemplary embodiment of the conveyance system according to this invention is shown in the accompanying drawings, wherein:

FIG. 4 shows the conveyance system in cross-sectional view taken long a horizontal plane indicated by the line IV—IV of FIG. 2.

Figure 1:
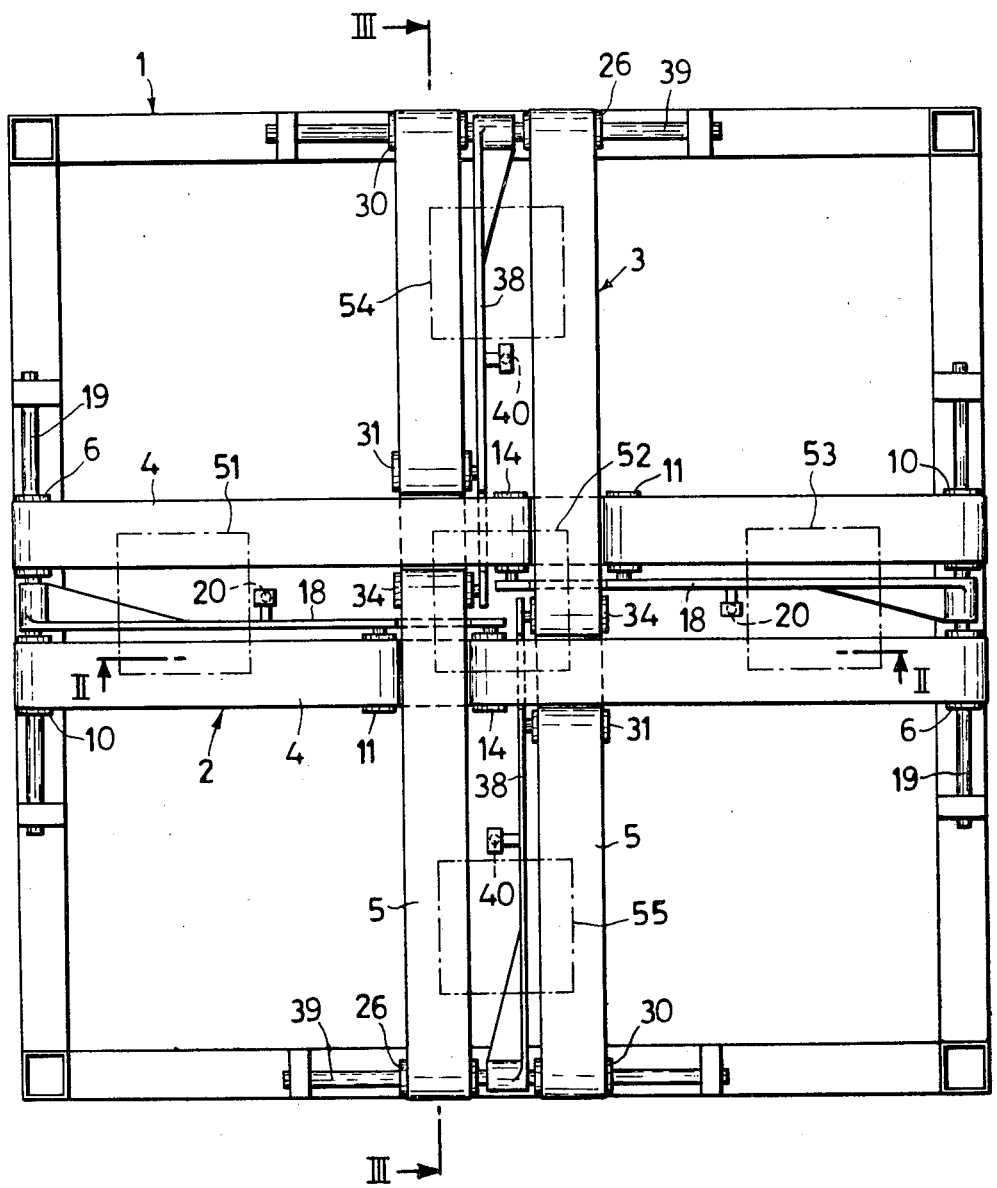
FIG. 1 shows a top plan view of the conveyance unit in question.

The conveyance system as shown in the drawings comprises a fixed frame 1, which supports two crossed conveyors, 2 and 3, each of which is composed by a couple of conveyor belts which are parallel and coplanar, 4 and 5, respectively.

Figure 2:
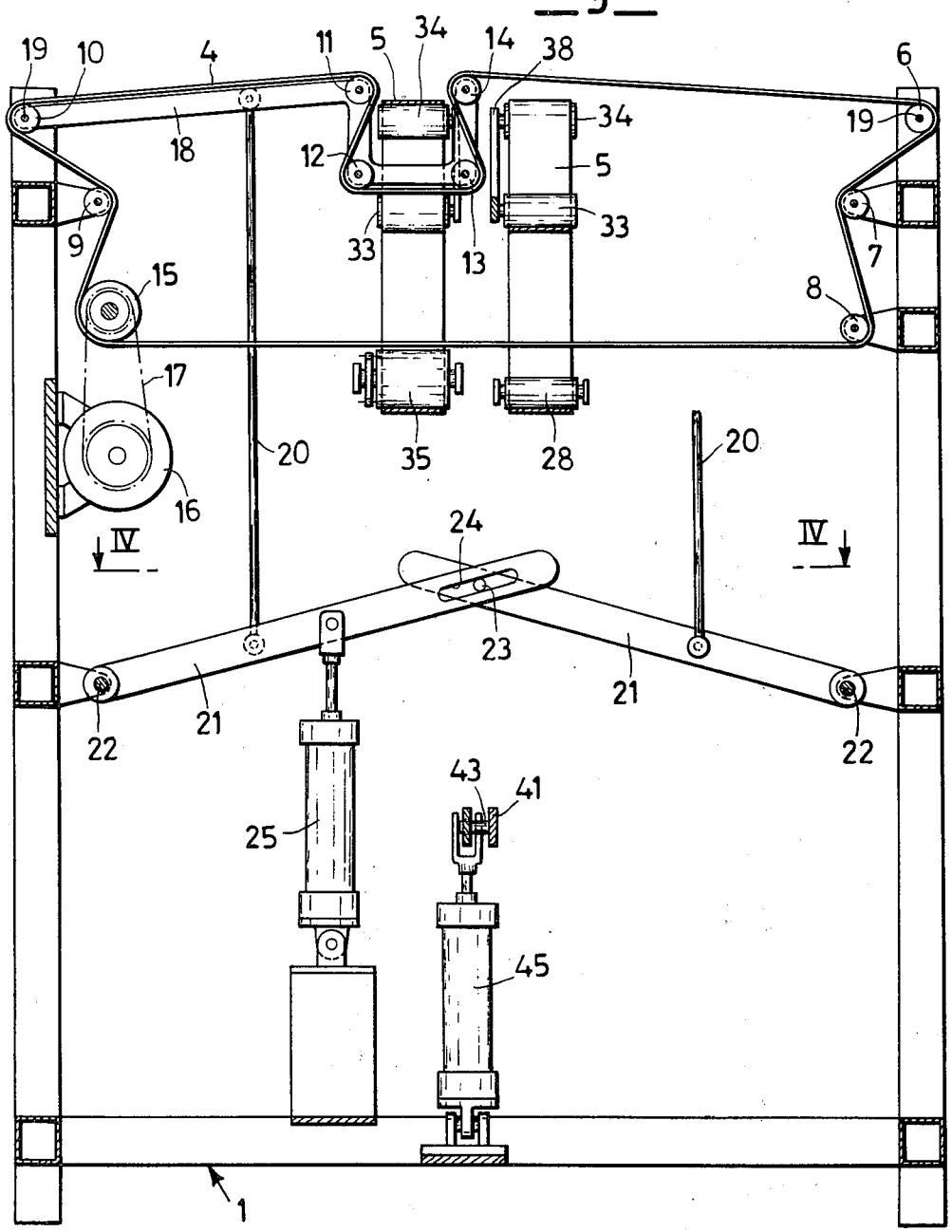
FIG. 2 shows the same conveyance system in cross-sectional view taken along a vertical plane indicated by the line II—II of FIG. 1.

As can be seen in FIGS. 1, 2 and 4, each of the belts 4, arranged and driven in a mutually symmetrical way, forms a closed loop which is held taut by a plurality of idle belt-stretching rollers 6 to 14 and is driven by a motive roller 15 as actuated by a motor 16 through a belt transmission 17. While the idle rollers 6 to 9 are borne for rotation by the base frame 1, the idle rollers 10 to 14 are borne for rotation by a swinging arm 18, which is pivoted at 19 to the base frame 1 and is so shaped as to form a U-shaped bend so that it causes the belt 4 to take this bend also in correspondence with the crossing with the nearby belt 5 of the conveyor 3. The two swingable arms 18 which bear the belts 4 are mechanically linked, by the agency of pitmans 20 to two arms 21, pivoted at 22 to the frame 1 and mutually interlocked by the engagement of a pin 23 with a slot 24 (FIG. 2). A pneumatic ram 25 borne by the frame 1 acts upon the arms 21 and, via the rods 20, upon the swingable arms 18 so as alternately to position the belts 4 with their upper laps either horizontal or shifted upwards as shown in FIG. 2.

Figure 3:
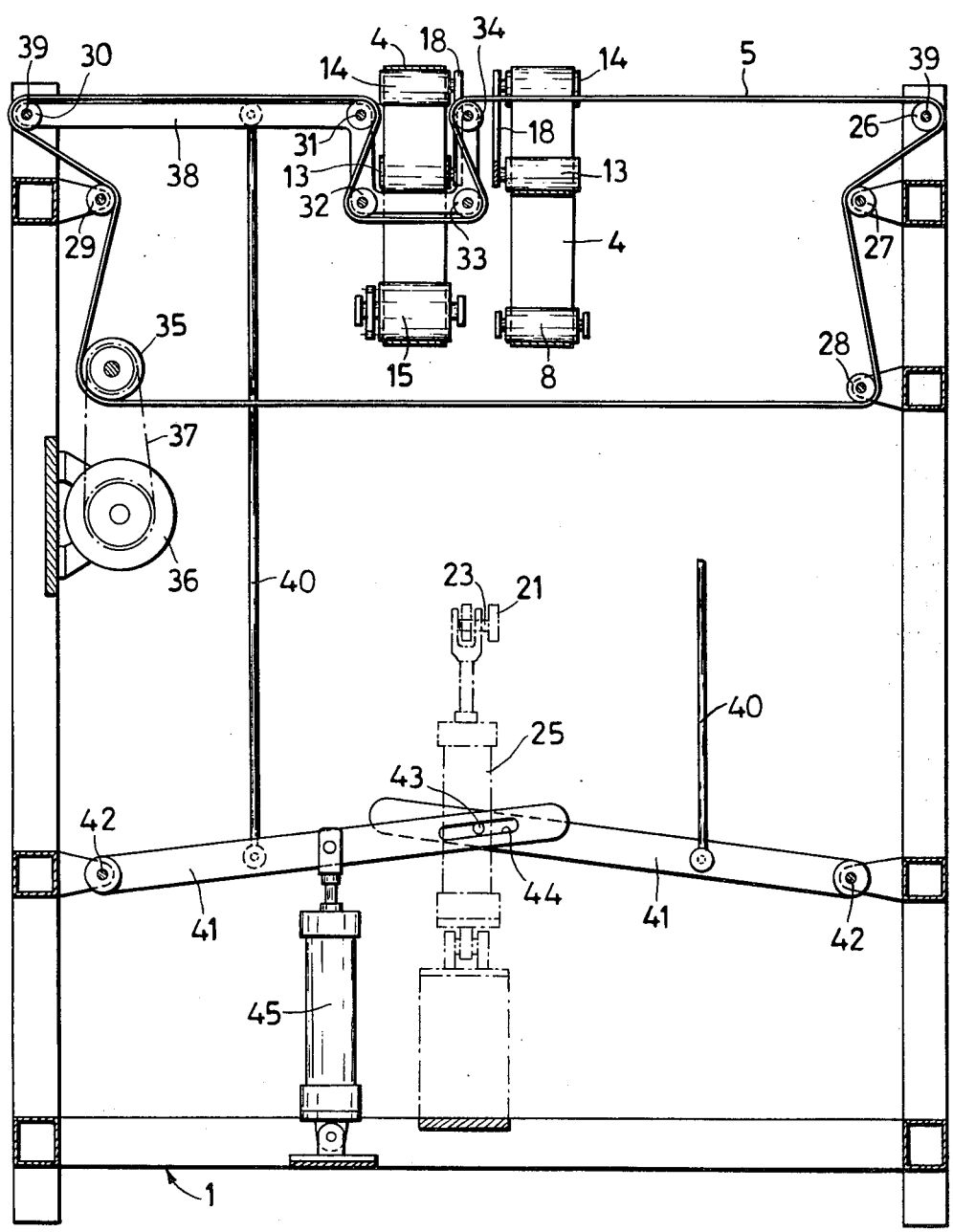
FIG. 3 shows the conveyance system in cross-sectinal view taken along the vertical plane indicated by the line III—III of FIG. 1.

In very much the same way (FIGS. 1, 3 and 4), each of the belts 5, arranged and driven in a mutually symmetrical way, makes up a closed loop held taut by a plurality of idle rollers 26 to 34 and is driven by a motive roller 35 actuated by a motor 36 by the agency of a belt transmission 37. While the idle rollers 26–29 are borne for rotation by the base frame 1, the idle rollers 30 to 34 are borne for rotation by a swingable arm 38, which is pivoted at 39 to the base frame 1 and is so shaped as to form a U-shaped bend so that it causes the belt 5 to take this bend also, in correspondence with the crossing with the nearby belt 4 of the conveyor 2. The two swingable arms which bear the two belts 5 are mechanically linked by pitmans 40 to two arms 41 which are pivoted at 42 to the frame 1 and are mutually interlocked by the engagement of a pin 43 with a slot 44 (FIG. 3). A pneumatic ram 45 borne by the frame 1 acts upon the arms 41 and, by the agency of the rods 40, on the swingable arms 38 so as alternately to position the belts 5 with their upper laps either horizontal as shown in FIG. 3 (when the upper lap of the belts 4 is shifted upwards as shown in FIG. 2), or shifted upwards (when the upper lap of the belts 4 is horizontal).

As outlined above, each of the belts 4 and 5 undergoes a temporary U-shaped deviation from the normal run of its upper lap in correspondence with its crossing with either belt of the other couple, so as to be passed therebeneath and thus enabling the belts actually to be crossed. Actually, as clearly shown in FIG. 1, the crossing of the two conveyors 2 and 3 is carried out in such a way that a first belt 4 (the one at the lower level as viewed in FIG. 1) is passed beneath a first belt 5 (the left one as viewed in FIG. 1), the second belt 4 is passed beneath the second belt 5, the first belt 5 is passed beneath the second belt 4 and the second belt 5 is passed beneath the first belt 4. This arrangement enables each of the belts 4 and 5 to leave only temporarily, and each at a time for each couple, the normal run of the working top lap and thus is capable of continually providing an efficient rest surface to the articles being conveyed.

The mode of operation (as a mere conveyor or also as a shifting mechanism) of the conveyance system as shown in the drawing is essentially a function of the manner in which the two pneumatical rams 25 and 45 are controlled. If these are arranged and maintained as shown in FIGS. 2 and 3, the two belts 4 of the conveyor 2 are at a higher level than the belts 5 of the conveyor 3, so that a heap of articles, such as newspapers, fed to the conveyor 2 at the position 51 shown in FIG. 1 and caused to advance towards the right by a movement in such direction impressed to the conveyor 2, reaches the crossing position 52 (where it can be seen that limited portions only of the resting edges of the heap are temporarily left free, but one at a time, by the belts which support them) and goes then its run on the conveyor 2 towards the position 53 and lastly to the exit. If, conversely, once the articles have reached the crossing position 52, the pneumatic rams 25 and 45 are actuated (either manually or, as it is certainly advisable, due to the effect of a command signal originated automatically by a specially provided programming device as a result of a signal as produced by a photocell or otherwise to indicate the arrival of the articles to the crossing position 52 or immediately nearby) so as to reverse their position, thus bringing the belts 5 of the conveyor 3 at a higher level than the belts 4 (which are now horizontal) of the conveyor 2, the articles are no longer forwarded to the position 53, but, rather, they are seized by the conveyor 3 and, according to the direction of feed of the latter, they are shifted towards the positions 54 or the position 55 (FIG. 1). The same is true, even with a reversal of a heap of articles placed on the conveyor 3 when the latter is positioned at the higher level.

What we claim is:

1. A conveyance system with crossing, especially suitable for the conveyance and switching of newspapers, magazines and other articles composed by superposed sheets, comprising two conveyors which cross perpendicularly to one another and are displaceable in the vertical direction with respect to one another so that either of them is alternately positioned at a higher level than the other one, characterized in that each of these conveyors is composed by a couple of parallel and coplanar belts, which cross those of the other couple while undergoing temporary U-shaped deflections with respect to their normal run direction so as to be passed the ones beneath the others, the crossing being so obtained that a first belt of a first couple is passed beneath a first belt of the second couple, the second belt of the first couple is passed beneath the second belt of the second couple, the first belt of the second couple is passed beneath the second belt of the first couple and the second belt of the second couple is passed beneath the first belt of the first couple.

2. A conveyance system according to claim 1, characterized in that each belt forms a closed loop, which along nearly one half of its run engages a plurality of idle rollers borne by a swingable arm which so shaped as to form a U-bend, and cause the belt supported thereby to form such a bend, in correspondence with the crossing with the nearby belt of the other couple, the swingable arms which support the two belts of each couple being mechanically linked to two interlocked arms driven by a fluid-actuated ram so as to be simultaneously switched from a position which provides a lowered position of the two belts and a position which provides a higher-level position of the two belts, the fluid-operated rams controlling the two couples of belts being simultaneously actuable in opposite directions so that, when a couple of belts is displaced towards the higher-level position, the other couple is displaced towards the lower-level position, and vice versa.

* * * * *